Patented Sept. 26, 1950

2,523,275

UNITED STATES PATENT OFFICE 2,523,275

SUBSTITUTED GLYCINAMIDES

William F. Bruce, Havertown, and Joseph Seifter, Willow Grove, Pa., assignors to Wyeth Incorporated, Philadelphia, Pa., a corporation of Delaware No Drawing. Original application May 10, 1946, Serial No. 668,786. Divided and this application January 2, 1948, Serial No. 357

5 Claims. (Cl. 260—562)

This invention relates to new substituted glycinamides having the general formula $R_1NHCH_2CONHR_2$ It has been observed by some workers that a small number of glycinamide derivatives evidence some local anesthetic action although a systematic study of the pharmacological actions of substituted glycinamides had never been reported.

We have found, in the preparation and thorough study of a great number of new substituted glycinamides, that a relatively large number of these substituted glycinamides evidence marked pharmacological actions hitherto unsuspected in the art and which we consider to be highly useful in the medicinal field. Specifically, we have found that when particular amines are used in the preparation of the compounds of our invention, glycinamide products evidence useful pharmacological action, more specifically described below.

The new compounds of this invention have the general formula as indicated above where $R_1$ may be a higher alkyl ranging from 5 to 9 carbon atoms, while $R_2$ may be an alkyl ranging from 1 to 9 carbon atoms, or an aralkyl radical having an alkyl chain of 2 to 5 carbon atoms.

It is to be further noted that $R_1$ and $R_2$ may be similar radicals, as for example, where $R_1$ and $R_2$ are both alkyls and contain the same number of carbon atoms having the same structural relation; or $R_1$ and $R_2$ may be dissimilar radicals, for example, where $R_1$ is a higher alkyl and $R_2$ is an aralkyl of the type above-mentioned.

In general, the compounds of the invention may be synthesized by reacting an appropriate chloroacetamide corresponding to the formula $ClCH_2CONHR_2$ with an appropriate primary amine corresponding to the formula $R_1NH_2$ where $R_1$ and $R_2$ have the same meaning as indicated hereinabove.

The primary amine may be prepared in known manner. The preferred method for preparation of the chloroacetamide intermediate involves reacting chloroacetylchloride with a primary amine $R_2$—$NH_2$ in the presence of benzene as a solvent for the reactants. Heating may or may not be necessary depending on the speed of the particular reaction. The chloroacetamide remains in solution and is separated from the solvent by distilling off the latter under low pressures. In general, a molar ratio of chloride to amine of about 1:2 is preferred for the reaction.

The reaction of the appropriate chloroacetamide and the appropriate primary amine to form the desired substituted glycinamide is preferably operated with a molar ratio, amide to amine of about 1:1 and is carried out in the presence of a solvent for the reactants such as higher alcohols having four to seven carbon atoms in the molecule, dioxane or hydrocarbon solvents, for example, xylene. The reaction is carried out also in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing and the temperature is the refluxing temperature of the particular solvent selected. Generally, a period of about 10–15 hours is sufficient for complete reaction. In the event that solids are formed, these are removed by filtration, the product remaining in solution in the solvent. The solvent is then removed by distillation at low pressures to obtain the substituted glycinamide product.

The new compounds have valuable properties and are useful in that they possess at least one of the following actions: local anesthetic, pressor, spasmolytic, analgesic, sedative and convulsant action.

It is known that certain amines possess a vasoconstrictor action and are identified as pressor amines. As an important feature of the invention, it has been discovered that when pressor amines, represented by the above-mentioned $R_1NH_2$ or $R_2$—$NH_2$ amines, are used as intermediates in forming the new compounds, and particularly when $R_1NH_2$ is a pressor amine, the new products possess pronounced physiological action. When both amines are pressor amines, even greater physiological action in the new compounds has been noted. Thus in substituted glycinamides corresponding to the formula $R_1NHCH_2CONHR_2$ when a pressor amine has been combined, and particularly on the amino side (left-hand side) of the molecule, the compounds possess very considerable anesthetic action and in some cases anesthetic action of a high order combined with pressor action. While certain pressor amines may themselves possess a certain small amount of local anesthetic action, a surprising increase in anesthetic action has been found in the corresponding glycinamide compounds.

It has been discovered in the compounds of the invention having the general formula

that when the radicals R₁NH and/or NHR₂ are the residues of primary pressor amines, a critically new physiological action is found that is different from the physiological action of the primary pressor amines alone. As an example, when the primary pressor amine, 1-methylhexyl amine is condensed with N-alpha-chloroaceto-1-methylhexyl amine, it has been found that the primary pressor amine residue.

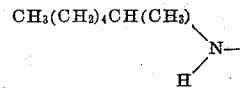

imparts to the glycinamide enhanced local anesthetic action far superior to the anesthetic action of 1-methylhexyl amine itself. Moreover, this enhanced action is noted when either R₁NH or NHR₂ is a primary pressor amine residue, particularly in the case where R₁NH is the primary pressor amine residue, and more particularly when both are primary pressor amine residues. It should be pointed out, however, that the use of primary pressor amines is not invariably necessary in order to obtain the substituted glycinamides of our invention having highly useful physiological properties.

Certain of the compounds of the invention have been found also to possess not only a local anesthetic action superior to cocaine, but also a spasmolytic or anti-spasmodic action, while at the same time having a toxicity considerably below that of cocaine.

The following table illustrates the physiological action of a number of representative compounds when compared to the action of cocaine as a local anesthetic and papaverine as a spasmolytic.

mm. The yield of N-alpha-chloroaceto-1-methylhexyl amine was 30 grams.

A solution of 10 grams of N-alpha-chloroaceto-1-methylhexyl amine and 5.7 grams of 1-methylhexyl amine, together with 5 grams of sodium carbonate, in 25 cc. of n-butanol was refluxed for 12 hours. The organic layer was washed with water until the washings were free of halogen. It was then dried, concentrated in vacuo and distilled. The product, alpha-1-methylhexyl-amino-N-1-methylhexyl acetamide boiled from 180–185° C. at a pressure of 4 mm. and from 148–151° C. at 0.5 mm. The yield of colorless, viscous oil was 13 grams.

*Analysis*

|  | Carbon | Hydrogen | Nitrogen |
|---|---|---|---|
| Calculated for $C_{16}H_{34}N_2O$ | 71.05 | 12.67 | 10.36 |
| Found | 70.93 | 12.49 | 10.20 |

EXAMPLE II

*Preparation of alpha-1-methylhexylamino-N-(1-methyl-2-phenylethyl) acetamide*

For the preparation of the appropriate chloroacetamide intermediate, a solution of 27 grams of amphetamine in 80 cc. of benzene was added in portions to a solution of 11.3 grams of chloracetyl chloride in benzene. Heat was evolved and the addition was done at a rate which kept the temperature between 50° and 60° C. On standing, solid amphetamine hydrochloride precipitated and was collected on a filter. This weighed 13.5 grams and melted at 149° C. The filtrate after removal of the solvent in vacuo gave a yellow oil which solidified on standing. It weighed 26 grams and melted at 68° C. It was moderately soluble in cold ethanol and ethyl

|  | Potency | | | Toxicity, LD 50 in mg./Kg. | |
|---|---|---|---|---|---|
|  | Cocaine (Rabbit Cornea) | Papaverine Isolated (Rabbit Intestine) | Adrenaline Ratio | Subcutaneous | Intraperitoneal |
| 1 Cocaine | 1.0 |  |  | 150 | 75 |
| 2 Papaverine |  | 1.0 |  |  |  |
| 3 a-1-methylhexylamino-N-1-methylhexyl acetamide | 4.0 | 2.0 | 0 | 290 | 103 |
| 4 a-1-methylhexylamino-N-(1-methyl-2-phenylethyl) acetamide | 2.0 | 0.5 | 0 | 159 | 117 |

Proceeding to a better understanding of this invention, illustrative specific procedures for the preparation of representative compounds falling within the general formula are set forth in the following examples.

EXAMPLE I

*Preparation of alpha-1-methylhexylamino-N-1-methylhexyl acetamide*

In order to first prepare the chloroacetamide intermediate, 46 grams of 1-methylhexyl amine was added slowly with stirring to a solution of 22.6 grams of chloroacetyl chloride in 100 cc. of benzene. After the solution had cooled, no precipitate of the hydrochloride salt appeared. The solution was concentrated and distilled at a temperature of 113–115° C.; under a vacuum of 3 acetate and readily soluble in chloroform. It was crystallized from ethyl acetate with the addition of petroleum ether. The recrystallized product, N - alpha - chloroacetoamphetamine melted at 71–72° C. Analysis showed 6.0% N (calcd. 6.6%). A sample on distillation boiled at 155–165° C. at 3 mm.

A solution of 14 grams of N-alpha-chloroaceto-dl-amphetamine and 8 grams of 1-methylhexylamine together with 5 grams of sodium carbonate in 50 cc. of n-butanol was refluxed for 12 hours. The solids were filtered off and the filtrate was concentrated in vacuo and distilled. The product, alpha - 1-methyl-hexylamino-N-(1-methyl-2-phenylethyl) acetamide was a colorless oil boiling at 185–190° C. at a pressure of 2 mm. The yield was 11 grams.

Analysis

| | Carbon | Hydrogen | Nitrogen |
|---|---|---|---|
| Calculated for $C_{18}H_{30}N_2O$ | 74.46 | 10.42 | 9.65 |
| Found | 74.54 | 10.55 | 9.67 |

By procedures analogues to those described in the above examples, the appropriate primary amine, $R_1NH_2$, preferably a pressor amine and the appropriate chloracetamide corresponding to the formula $$ClCH_2CONHR_2$$

where $R_2$ represents a radical as indicated above, can be reacted to form the following substituted glycinamides representative of those comprehended in this invention.

1. alpha-1-methylhexylamino - N - methyl acetamide.
2. alpha-1,3-dimethylpentylamino - N - methyl acetamide.
3. alpha-1,3-dimethylpentylamino-N - 1,3 - dimethylpentyl acetamide.
4. alpha-1,5-dimethylhexylamino-N-methyl acetamide.
5. alpha-1-methylheptylamino -N- methyl acetamide.
6. alpha-1,2,5-trimethylhexylamino-N - methylacetamide.
7. alpha-1-ethylpentylamino-N-ethyl acetamide.
8. alpha-(1,4-dimethylhexylamino)-N - methyl acetamide.
9. alpha-1-methylhexylamino-N-2-(4 - methylhexyl) acetamide.
10. alpha-1-methylbutylamino-N - 1 - methylbutyl acetamide.
11. alpha - 1,4 - dimethylpentylamino - N - diphenylmethyl acetamide.

Substantially all of the products of the invention are high boiling basic liquids of limited solubility. It is contemplated within the scope of this invention that while the products may be used in their basic form, they may also be prepared and used in the well-known manner in the form of their acid-addition salts. The preparation of such a salt is well-known and generally involves the addition of the selected acid to an ether, alcohol or water solution of the basic product. The acid is chosen to yield a salt which is known to those skilled in the art as being physiologically non-toxic. As examples, the hydrochloride, sulfate or acetate salts of the new products may be used.

It is further contemplated that those substituted glycinamides, or the non-toxic salts thereof, which are less soluble in dilute acid than 0.5% by weight, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long chain fatty acid partial esters of hexitol anhydrides or oxyalkylene derivatives thereof, vegetable and animal oils and ointment bases such as petroleum jelly or cholesterol are examples of solvents that are considered useful in admixture with the substituted glycinamides for obtaining an enhanced physiological effect.

Many modifications of the invention will be apparent to those skilled in the art without departure therefrom or from the scope of the claims, and since the foregoing disclosure has been given by way of example for clearness and understanding, only, no unnecessary limitations should be understood and the appended claims should be construed as broadly as the state of the art permits.

This application is a division of application Serial No. 668,786, filed May 10, 1946 now Patent No. 2,449,638, dated September 21, 1948.

We claim:
1. New compounds selected from the group consisting of substituted glycinamides, corresponding to the formula

$$R_1NHCH_2CONHR_2$$

wherein $R_1$ is a branched chain alkyl having 5 to 9 carbon atoms and $R_2$ is a member of the group consisting of an alkyl and an aralkyl having alkyl chains of 2 to 5 carbon atoms and a single isocyclic group; and the non-toxic salts of said substituted glycinamides.

2. Substituted glycinamides, corresponding to the formula $$R_1NHCH_2CONHR_2$$

where $R_1$ is a branched chain alkyl having 5 to 9 carbon atoms and $R_2$ is an alkyl radical.

3. Substituted glycinamides, corresponding to the formula $$R_1NHCH_2CONHR_2$$

where $R_1$ is a branched chain alkyl having 5 to 9 carbon atoms and $R_2$ is an aralkyl radical having 2 to 5 carbon atoms in the alkyl chain and a single isocyclic group.

4. The new compound, alpha-1-methylhexylamino-N-1-methylhexyl acetamide.

5. The new compound, alpha-1-methylhexylamino-N-(1-methyl-2-phenylethyl) acetamide.

WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,139,190 | Iselin et al. | Dec. 6, 1938 |
| 2,328,021 | Katzman et al. | Aug. 31, 1943 |
| 2,411,662 | Martin et al. | Nov. 26 1946 |

OTHER REFERENCES

Braun et al. "Ber. Deut. Chem.," vol. 60 (1927), page 354.

Braun et al. "Ber. Deut. Chem." vol. 62 (1929) pages 2766–2776.